Figure 4:
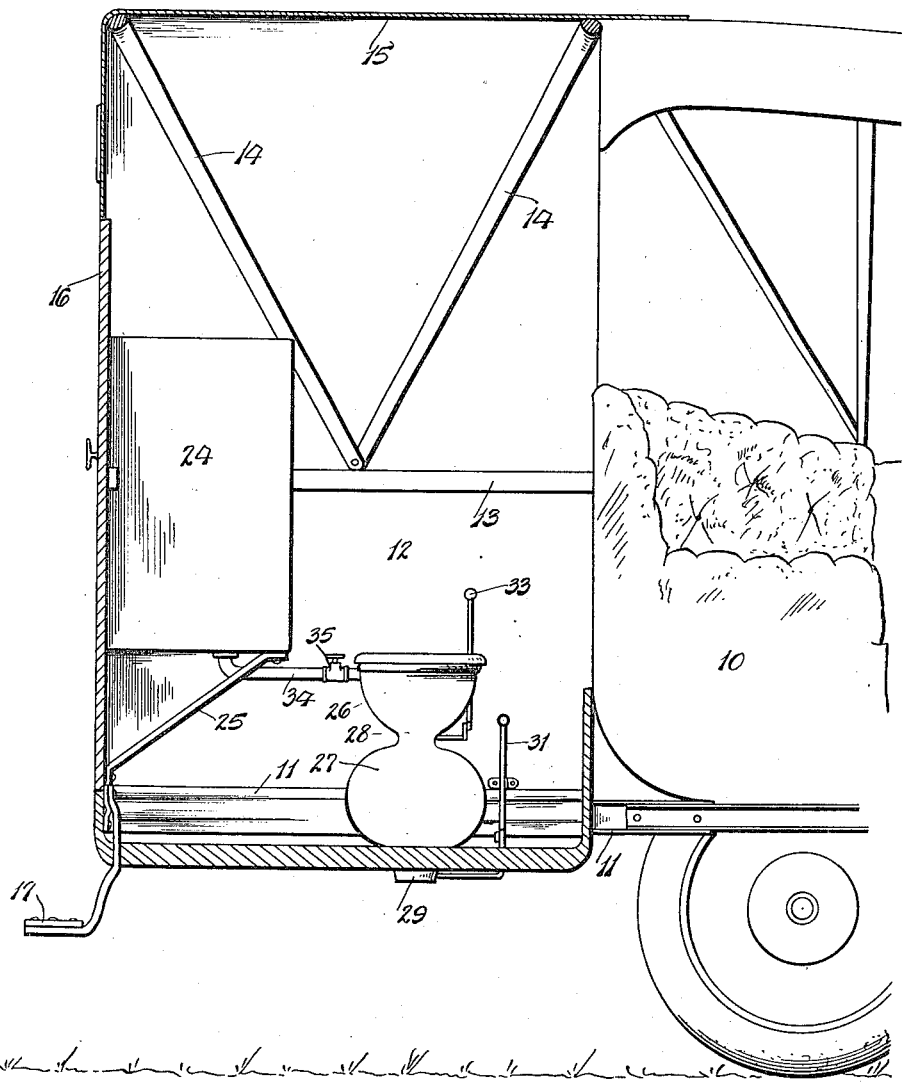

Nov. 4, 1924.
W. A. HARDING
1,514,157
TOILET FOR MOTOR VEHICLES
Filed May 25, 1921
3 Sheets—Sheet 1
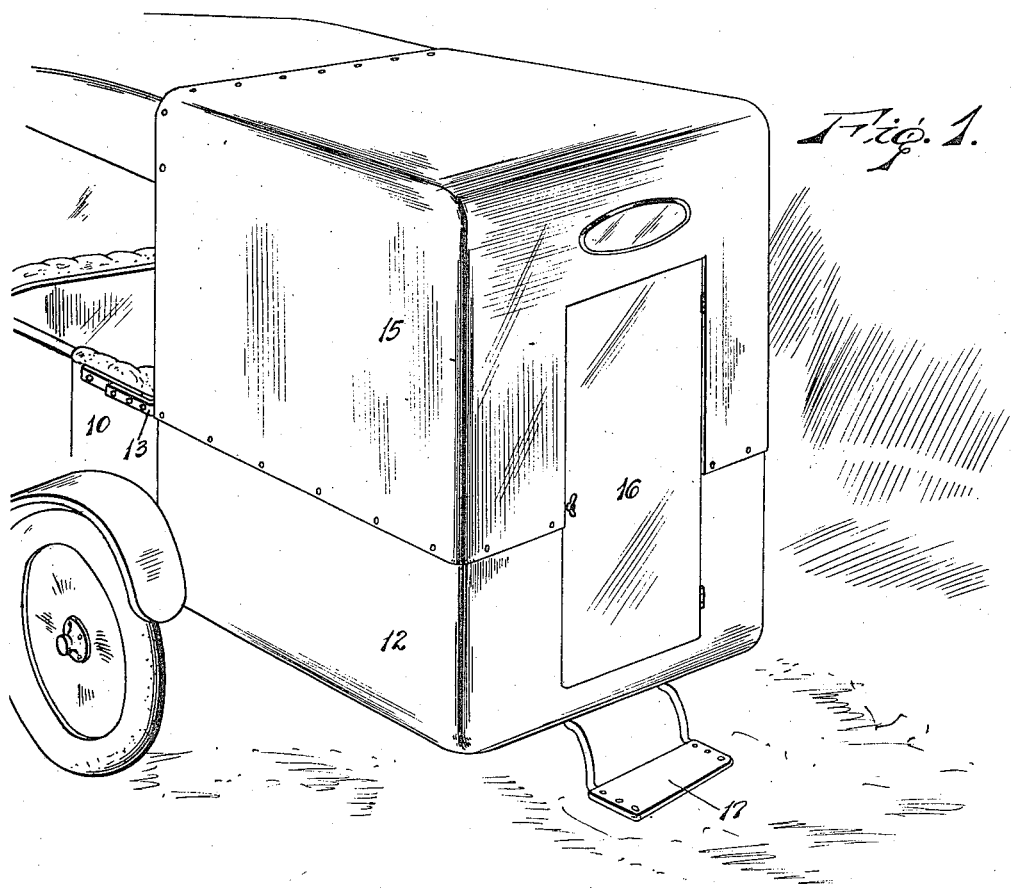
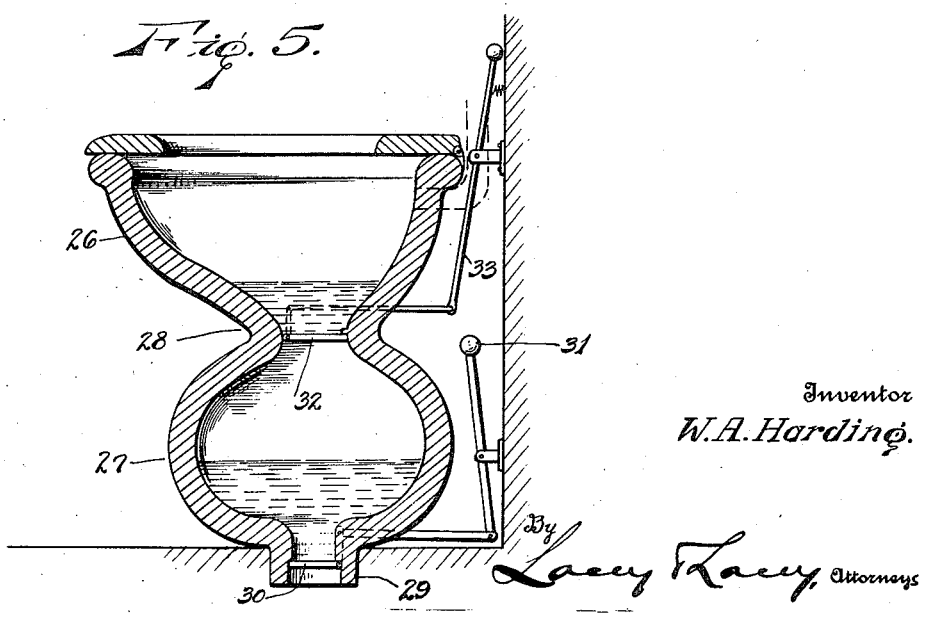
Inventor
W. A. Harding.
By Lacey & Lacey, Attorneys

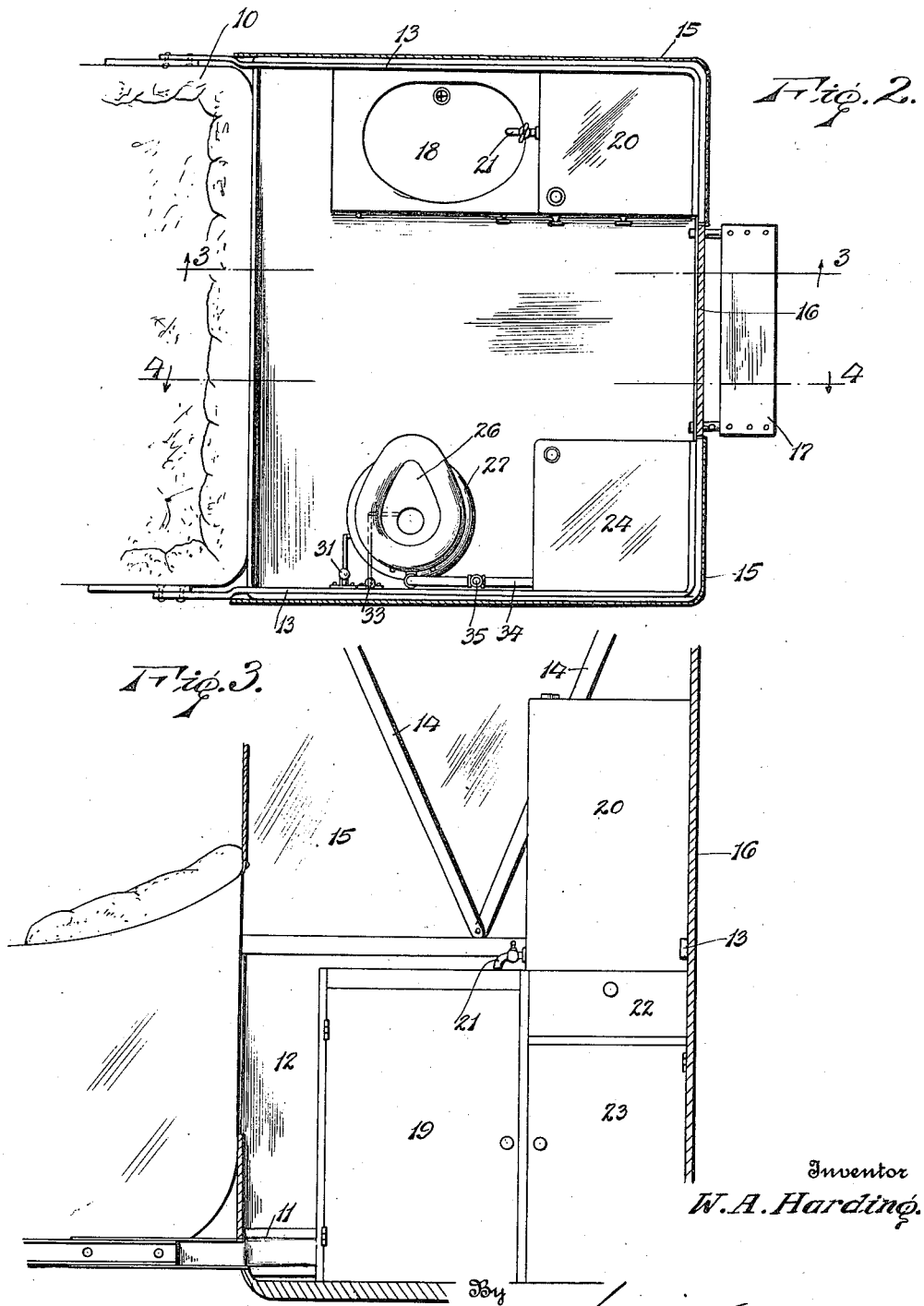

Nov. 4, 1924.

W. A. HARDING 1,514,157

TOILET FOR MOTOR VEHICLES

Filed May 25, 1921

3 Sheets-Sheet 3

Inventor

W. A. Harding.

By Lacy & Lacy

Attorneys

Patented Nov. 4, 1924.

1,514,157

UNITED STATES PATENT OFFICE.

WILLIAM ARTHUR HARDING, OF MULLEN, NEBRASKA.

TOILET FOR MOTOR VEHICLES.

Application filed May 25, 1921. Serial No. 472,335.

*To all whom it may concern:*

Be it known that I, WILLIAM ARTHUR HARDING, citizen of the United States, residing at Mullen, in the county of Hooker and State of Nebraska, have invented certain new and useful Improvements in Toilets for Motor Vehicles, of which the following is a specification.

This invention relates to an improved toilet for motor vehicles, being particularly designed for use in connection with the automobiles of tourists and has as one of its principal objects to provide an attachment whereby persons traveling in an automobile may always have the conveniences of a toilet readily accessible.

The invention has as a further object to provide a toilet wherein entire privacy will be afforded and of such construction that the toilet may be readily employed in connection with any ordinary touring car.

And the invention has as a still further object to provide an attachment wherein a supply of drinking water may be carried as well as towels and different toilet articles.

Other and incidental objects will appear hereinafter.

In the drawings:

Figure 1 is a fragmentary perspective view showing my improved toilet in connection with a motor vehicle of conventional design, Figure 2 is a horizontal sectional view looking downwardly, Figure 3 is a fragmentary vertical section on the line 3—3 of Figure 2, looking in the direction of the arrows, Figure 4 is a fragmentary vertical section on the line 4—4 of Figure 2, looking in the direction of the arrows, and Figure 5 is a sectional view showing the commode employed in detail.

Referring now more particularly to the drawings, I have shown my improved toilet in connection with a motor vehicle 10 of conventional design. In carrying the invention into effect, I employ a substantially U-sectioned bottom frame 11 the sides of which are, as shown in Figure 4, secured at their ends to the rear end portions of the side members of the frame of the motor vehicle chassis so that the frame 11 is thus rigidly connected with the vehicle. Suitably mounted upon said frame is a body 12 having parallel side and end walls as well as a suitable floor. As will be observed, the front wall is somewhat shorter than the back wall while the side walls are extended beyond the front wall and are shaped at their adjacent edges to conform to the contour of the rear end of the vehicle body. Secured to the body near its upper end are companion L-sectioned frame bars 13 extending along the upper margins of the back and side walls and secured at their forward ends to the rear end of the vehicle body the bars 13 being each formed of adjustably connected sections. Thus, the body 12 will be rigidly connected with the vehicle. Pivoted upon the side walls of the toilet body are upstanding forwardly and rearwardly inclined bows 14 and supported by said bows is a top 15 of fabric or other appropriate material. This top is of a height to form a continuation of the top of the vehicle, being buttoned or otherwise detachably secured to the vehicle top. As will be observed, the top 15 is formed with side walls secured to the sides of the body 12 and with a rear end wall secured to the rear end wall of said body so that the toilet is thus completely enclosed. At its rear end, the toilet is provided with a suitable door 16 while a step 17 is employed so that the toilet may be readily entered.

Mounted within the toilet body 12 against one of the side walls thereof is an appropriate basin 18 below which is, as particularly shown in Figure 3, a cupboard 19. Mounted in the adjacent corner of the body 12 is a water tank 20 having a spigot 21 disposed to empty into the basin so that water may be readily drawn from the tank into the basin. Beneath the tank 20 is provided a drawer 22 while below said drawer is arranged a cupboard 23. Toilet articles may, of course, be carried in the drawer 22 while the cupboards 19 and 23 each provide a convenient place for storing towels or linen.

Mounted in the corner of the body 12 opposite the tank 20 is a tank 24 supported by a bracket 25 and upstanding from the floor of the body adjacent said tank is a commode comprising an upper bowl 26 and a bottom receptacle 27 joined by a reduced neck 28. Leading from the receptacle through the floor is an outlet 29 integral with said receptacle and mounted in said outlet is a valve 30 controlled by a lever 31.

Mounted in the neck 28 is a second valve 32 controlled by a lever 33. Leading from the tank 24 into the bowl is a pipe 34 in which is arranged a valve 35 which may be operated for flushing the commode. As will be seen, after the commode has been used the valve 32 may be opened for emptying the contents of the bowl into the receptacle 27 where said contents may be carried until an appropriate place is reached for opening the valve 30 and discharging said contents from the receptacle.

As will be perceived in view of the foregoing description, persons touring by automobile will find my improved toilet highly convenient. In the present instance, I have shown the preferred embodiment of the invention. However, it is to be understood that various minor changes or variations may be resorted to within the spirit of the invention in order to adapt the toilet to various makes of vehicles and I accordingly reserve the right to all such modifications as may fall within the spirit of the appended claims.

Having thus described the invention, what is claimed as new is:

1. An attachment for motor vehicles comprising a bottom frame including attaching bars rigidly secured to the sides of a motor vehicle, a housing including a bottom portion and upstanding end and side walls integral with said bottom and defining a trough shaped body with open top, said side walls being secured to said bars, reinforcing bars firmly united with the top edges of the rear and side walls and rigidly secured to the sides of the motor vehicle, a detachable top covering of fabric material for the housing, and means for securing the edges of said top to the vehicle top and to the housing walls respectively.

2. An attachment for motor vehicles comprising a bottom frame including attaching bars rigidly secured to the sides of a motor vehicle, a housing including a bottom portion and upstanding end and side walls integral with said bottom and defining a trough shaped body with open top, said side walls being secured to said bars, reinforcing bars firmly united with the top edges of said rear and side walls and rigidly secured to the sides of the motor vehicle, bows pivoted on said side walls adjacent said reinforcing bars, a detachable top covering of fabric material supported by said bows, and means for securing the edges of said top to the vehicle top and to the housing walls respectively.

In testimony whereof I affix my signature.

WILLIAM ARTHUR HARDING. [L. S.]